United States Patent
Bharti et al.

(10) Patent No.: US 10,558,206 B2
(45) Date of Patent: Feb. 11, 2020

(54) ELECTRICAL DEVICE DEGRADATION DETERMINATION

(71) Applicant: INTERNATIONAL BUSINESS MACHINES CORPORATION, Armonk, NY (US)

(72) Inventors: Harish Bharti, Pune (IN); Abhay K. Patra, Pune (IN); Pranshu Tiwari, Dwaraka (IN); Saurabh Trehan, Patparganj (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 15/590,602

(22) Filed: May 9, 2017

(65) Prior Publication Data

US 2018/0329406 A1    Nov. 15, 2018

(51) Int. Cl.
G05B 23/02     (2006.01)
G06F 1/32      (2019.01)
H04L 12/24     (2006.01)
G06F 1/28      (2006.01)

(52) U.S. Cl.
CPC ..... G05B 23/0283 (2013.01); G05B 23/0232 (2013.01); G06F 1/28 (2013.01); H04L 41/5009 (2013.01)

(58) Field of Classification Search
CPC ... G05B 23/0232; G05B 23/0283; G06F 1/28; G06F 1/3206; H04L 41/5009
USPC ..... 702/60, 61, 62, 65, 34, 108; 700/30, 295
See application file for complete search history.

(56) References Cited

U.S. PATENT DOCUMENTS

| | | |
|---|---|---|
| 9,020,769 B2 | 4/2015 | Rada et al. |
| 2011/0178610 A1 | 6/2011 | O'Connor et al. |
| 2012/0158344 A1* | 6/2012 | Himmelstoss ......... G01R 31/04 |
| | | 702/108 |

(Continued)

OTHER PUBLICATIONS

Ganu, Tanuja, et al., "SocketWatch: An Autonomous Appliance Monitoring System", IEEE International Conference on Pervasive Computing and Communications (PerCom), 2014, 6 pgs.

(Continued)

*Primary Examiner* — John H Le
(74) *Attorney, Agent, or Firm* — Michael O'Keefe; Matthew M. Hulihan; Heslin Rothenberg Farley & Mesiti PC

(57) ABSTRACT

A method collects from at least one power measuring device of an environment power consumption data indicating active power consumption during a timeframe by an electrical device in the environment. The method also collects operating parameter data indicating at least one operating parameter under which the electrical device operates during at least a portion of the timeframe. The method performs, based on observing an increase in power consumption of the electrical device during the timeframe, assessing extents of contribution by potential contributing factors to the increase in power consumption, the potential contributing factors including time-based degradation of the electrical device and the at least one operating parameter. The method outputs, based on the assessing, an indication of an extent of contribution of degradation of the electrical device to the increase in power consumption.

20 Claims, 14 Drawing Sheets

(56) References Cited

U.S. PATENT DOCUMENTS

2015/0253364 A1 9/2015 Hieda et al.
2015/0378383 A1 12/2015 Hsu

OTHER PUBLICATIONS

Bhattacharjee, Sourodeep, et al., "Appliance classification using energy disaggregation in smart homes". Retrieved from Internet URL: <http:ieeexplore.ieee.org/xpl/login.jsp?tp=&arnumber=6915330&url=http%3A%2F%2Fieeexplore.ieee.org%2Fxpls%2Fabs_all.jsp%3Farnumber%3D6915330>, 2014 International Conference on Computation of Power, Energy, Information and Communication (ICCPEIC), IEEE, Apr. 16-17, 2014, 6 pgs.

Marwah, Manish, "Computational Sustainability: Smart Buildings" [date last accessed Apr. 7, 2017]. Retrieved from the Internet URL: https://web.archive.org/web/20161212114353/http://cs.stanford.edu/~ermon/cs325/slides/SmartBuildingsMarwah.pdf>, 67 pgs.

Chou, Jui-Sheng, et al., "Real-time detection of anomalous power consumption", Retrieved from Internet URL: <https://www.researchgate.net/publication/260559054_Real-time_detection_of_anomalous_power_consumption>, Renewable and Sustainable Energy Reviews, vol. 33, pp. 400-411, May 2014.

"Kill a Watt—Empowers you to save $100's on electric bills!" [retrieved from the Internet on Apr. 3, 2017]. Retrieved from URL: <http://www.p3international.com/products/p4400.html>, © 2017 P3 International Corporation, 1 pg.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Oct. 15, 2019, 2 pages.

"Electrical Device Degradation Determination", U.S. Appl. No. 16/598,501, filed Oct. 10, 2019, pp. 1-67.).

\* cited by examiner

ELECTRICAL DEVICE DEGRADATION DETERMINATION

BACKGROUND

Electrical devices, for instance home appliances such as heating and cooling equipment, undergo energy consumption performance degradation over time as the devices are used. There may be several different parameters that affect the rate and extent of this degradation, however existing approaches for monitoring energy efficiency performance fail to provide a comprehensive framework that adequately and properly considers these parameters.

SUMMARY

Shortcomings of the prior art are overcome and additional advantages are provided through the provision of a computer-implemented method. The method collects from at least one power measuring device of an environment power consumption data indicating active power consumption during a timeframe by an electrical device in the environment. The method also collects operating parameter data indicating at least one operating parameter under which the electrical device operates during at least a portion of the timeframe. The method performs, based on observing an increase in power consumption of the electrical device during the timeframe, assessing extents of contribution by potential contributing factors to the increase in power consumption, the potential contributing factors including time-based degradation of the electrical device and the at least one operating parameter. The method outputs, based on the assessing, an indication of an extent of contribution of degradation of the electrical device to the increase in power consumption.

Further, a computer program product including a computer readable storage medium readable by a processor and storing instructions for execution by the processor is provided for performing a method. The method collects from at least one power measuring device of an environment power consumption data indicating active power consumption during a timeframe by an electrical device in the environment. The method also collects operating parameter data indicating at least one operating parameter under which the electrical device operates during at least a portion of the timeframe. The method performs, based on observing an increase in power consumption of the electrical device during the timeframe, assessing extents of contribution by potential contributing factors to the increase in power consumption, the potential contributing factors including time-based degradation of the electrical device and the at least one operating parameter. The method outputs, based on the assessing, an indication of an extent of contribution of degradation of the electrical device to the increase in power consumption.

Yet further, a computer system is provided that includes a memory and a processor in communications with the memory, wherein the computer system is configured to perform a method. The method collects from at least one power measuring device of an environment power consumption data indicating active power consumption during a timeframe by an electrical device in the environment. The method also collects operating parameter data indicating at least one operating parameter under which the electrical device operates during at least a portion of the timeframe. The method performs, based on observing an increase in power consumption of the electrical device during the timeframe, assessing extents of contribution by potential contributing factors to the increase in power consumption, the potential contributing factors including time-based degradation of the electrical device and the at least one operating parameter. The method outputs, based on the assessing, an indication of an extent of contribution of degradation of the electrical device to the increase in power consumption.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
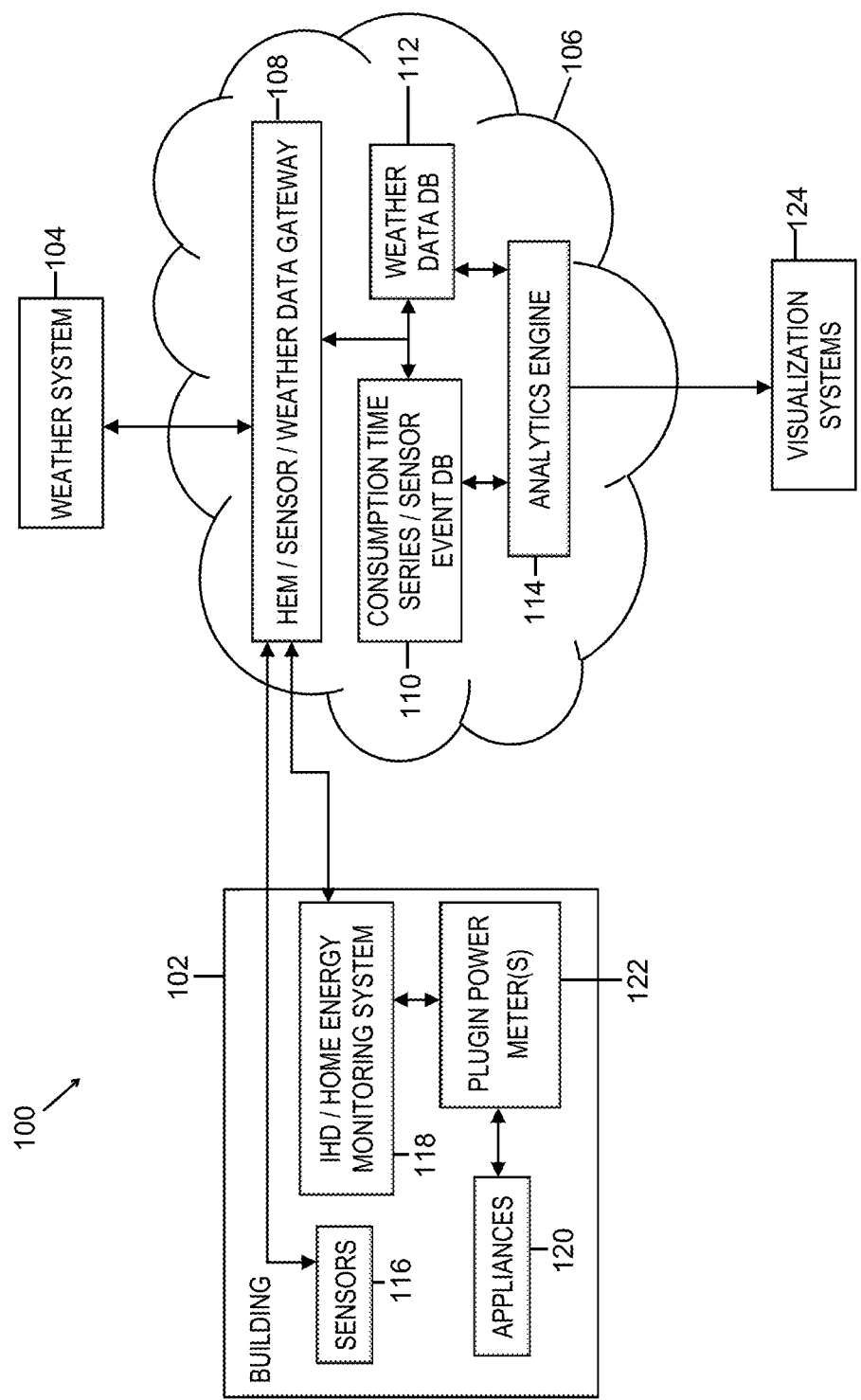
FIG. 1 depicts an example environment to incorporate and use aspects described herein.

While developments have been made in monitoring energy efficiency performance of electrical equipment/devices, no comprehensive method and framework exists to check electrical equipment degradation that considers the environmental and operating conditions or parameters and employs statistical analysis, such as validation analysis, to separate the impact of anomalous (outlier) power consumption due to abnormal operating conditions. Described herein are aspects providing a unified framework and methodology to enable informed decision-making for customers and other stakeholders to increase energy savings when using various electrical equipment. Aspects described herein can help stakeholders detect degradation of an electrical device by monitoring its patterns of energy consumption of active power, also known as "real" power. Active/real power is contrasted to other expressions of power, such as reactive and apparent power.

Output can help stakeholders realize energy savings by way of repairing or replacing electrical equipment when degradation is found to be abnormal, even when the equipment is operating under anomalous or abnormal operating conditions. Aspects can use multivariate data analysis considering time-based degradation together with the impact of variables such as ambient temperature, humidity, and real/active power consumption, to detect equipment deterioration by various metrics, such as peak monthly and average year-over-year active power consumption.

In particular, described herein is a method and framework that analyzes whether an observed increase in power consumption is due to device degradation, as opposed to variation(s) in a number of operating parameters of the electrical device, and the respective extents to which those variables contribute to the increase in power consumption. In the case of home heating, ventilation and air conditioning (HVAC) equipment, operating parameters considered can include the temperature and/or humidity under which the equipment operates, statuses of pertinent structural features like doors and windows of the building, and/or number of occupants in the building, as examples, which can all affect how much energy the equipment consumes in order to meet the desired heating or cooling level. The impact of these anomalies, leading to spikes in consumption and outlier data, is considered and may be removed in comparing the equipment's consumption with historical consumption values. In particular, if an increase in consumption is observed when comparing to historical values, the increase may be due to device degradation, operating parameters such as temperature, humidity, etc., and/or a combination of the foregoing. What might appear to be an abnormal rate of degradation of the device may actually be the result of abnormal operating parameters that cause the device to consume an inordinate amount of energy. Conversely, an apparently efficiently performing electrical device may suffer from faster degradation that is not observed because the operating parameters are particularly forgiving to the equipment. Aspects can further validate hypotheses with comprehensive testing and/or multivariate analysis considering various metrics, such as the average time (based on historical consumption) during which the device has been switched on and both peak monthly and average monthly year-over-year comparison.

Accordingly, some features provided in accordance with aspects of the described method/framework to detect presence and extent of degradation of, e.g., heating and cooling appliances based on power consumption patterns of real/active power are as follows:

Employing a model that considers environmental and operational parameters of the appliances for the performance analysis;

Removing impact of the anomalies of increase/outliers for parameters like temperature, humidity, and/or status of doors/windows and room occupancy before comparing the consumption with historical value(s);

Employing regression model for predicting consumption specific to degradation (independent of anomalous operating parameters); over a timeframe, for instance several years, predict a schedule of energy consumption to show device owner or other stakeholder what can be expected in terms of consumption in the future;

Validating hypothesis/hypotheses of device power performance degradation with comprehensive testing and multivariate analysis;

Accounting for average time (based on historical consumption) during which the existing device has been switched on and both peak monthly and average monthly year-over-year comparison;

Building a foundation for triggering a decision for replacement/repair of the appliance, comparing its power consumption performance with that of comparable segments, for instance same/similar user profile segment, same/similar appliance, same/similar model, and/or same/similar specification, as examples.

FIG. 1 depicts an example environment to incorporate and use aspects described herein. Environment 100 includes a cloud facility 106 hosting various components that may be accessed across one or more network(s), for instance one or more local area networks and/or wide areas networks, for instance the internet. Components include a home energy monitoring (HEM)/sensor/weather data gateway 108, a consumption time-series/sensor event database 110, weather data database 112, and analytics engine 114. Communications links shown as arrow lines extending between components shown in FIG. 1 include wired and/or wireless communications links, such as wired and/or cellular, Wi-Fi, or other types of wireless connections. More generally, these communications links may be any appropriate wireless or wired communication link(s) for communicating data.

Various systems communicate with the components of cloud facility 106. A weather system 104, for instance an external, internet-available resource for providing weather data via a weather application programming interface (API), communicates with HEM gateway 108 to provide weather data, for instance weather data pertaining to a usage environment in which an electrical device is used. An example usage environment is building 102, which may be a home, as one example. The weather data pertaining to the home may be time-series/sequenced temperature and humidity values of the environment (location) of the home.

Building 102 includes electrical appliances 120, for instance heating, ventilation and air conditioning (HVAC) appliances that consume power, one or more plugin power meter(s) 122, and an in-home display (IHD)/HEM system 118 that communicates with the HEM gateway 108 to provide consumption time-series data. Building also includes sensors 116 that communicate with the HEM gateway 108 to provide sensor data.

Metering at each load point (electrical device, e.g. each appliance) can be achieved through any one or more mechanisms, for instance by way of a plugin power meter (as shown in the example of FIG. 1), demand response sensors, instrumenting with a circuit breaker, using nonintrusive load monitoring (NILM), and/or power or energy disaggregation. In the example of FIG. 1, plugin power meter(s) 122 provide time-series power consumption data for connected appliance(s). The time-series power consumption data may include timestamped data values obtained periodically over time. A date value for a given time (indicated by an associated timestamp) can represent the amount of active power consumed by the appliance since a last reporting (e.g. last timestamped data value). In this regard, power consumption data may be provided periodically, for instance daily. The power consumption data is integrated to IHD/HEM system 118 having a HEM server, which can provide the time-series power consumption data to a meter data acquisition gateway server (e.g. component 108) hosted in the cloud facility 106.

Component 108 also acquires event indications/data form various sensors 116, for instance sensors to indicate door and window open/closed status, and current room occupancy (how many individuals are present in room(s) or HVAC zones of the building). The gateway 108 pushes the time-series power consumption data and sensor event data to database 110 for storage. Gateway 108 also invokes weather APIs on the weather system 104 to fetch weather data (e.g. temperature, humidity) for a desired analysis period for a location of interest, e.g. a geographic region or area where building 102 is located. Gateway 108 stores this data to the weather data database 112.

Analytics engine 114 processes the time-series power consumption data, sensor event data, and weather data to carry out analytics described herein, for instance described with reference to FIGS. 2A and 2B. In some embodiments, this analysis is performed on an appliance-by-appliance basis. An appliance may be a major appliance such as an air conditioning unit, furnace, or the like. Additionally or alternatively, data collected from individual appliances may be aggregated based on appliance type (for example all heating devices in/of/for the building, all cooling devices in/of/for the building, etc.) to form aggregate data on which analysis is performed.

Visualization system 124 is, for instance, a computer system that integrates with the analytics engine 114 to display near real-time power consumption performance information graphs, relating this performance information to historical power consumption data of a given appliance or across an appliance type.

Figure 2A:
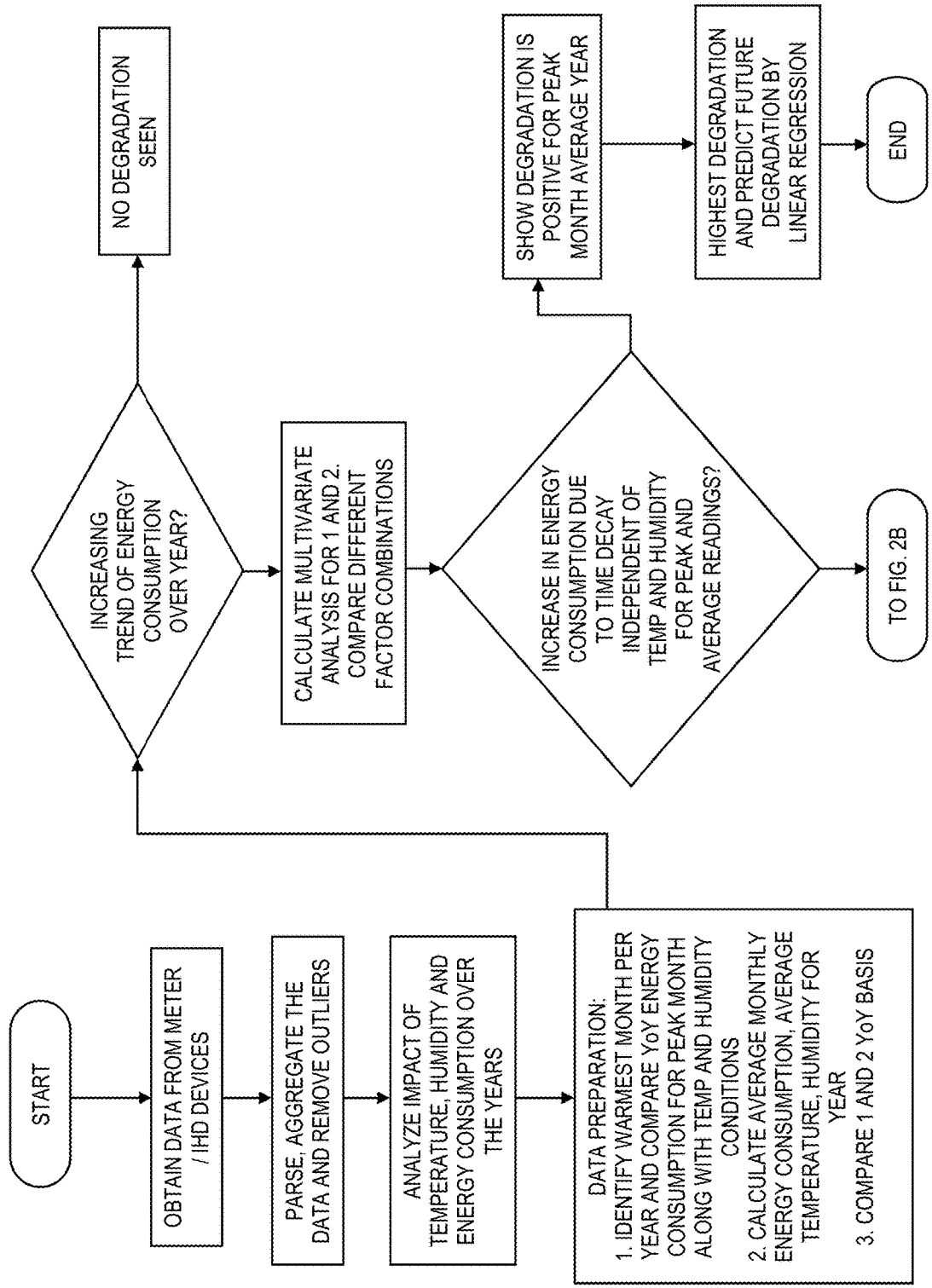
FIGS. 2A and 2B collectively depict an example process for detecting time-based degradation of a heating/cooling appliance based on power consumption patterns of active power, in accordance with aspects described herein.
Figure 2B:
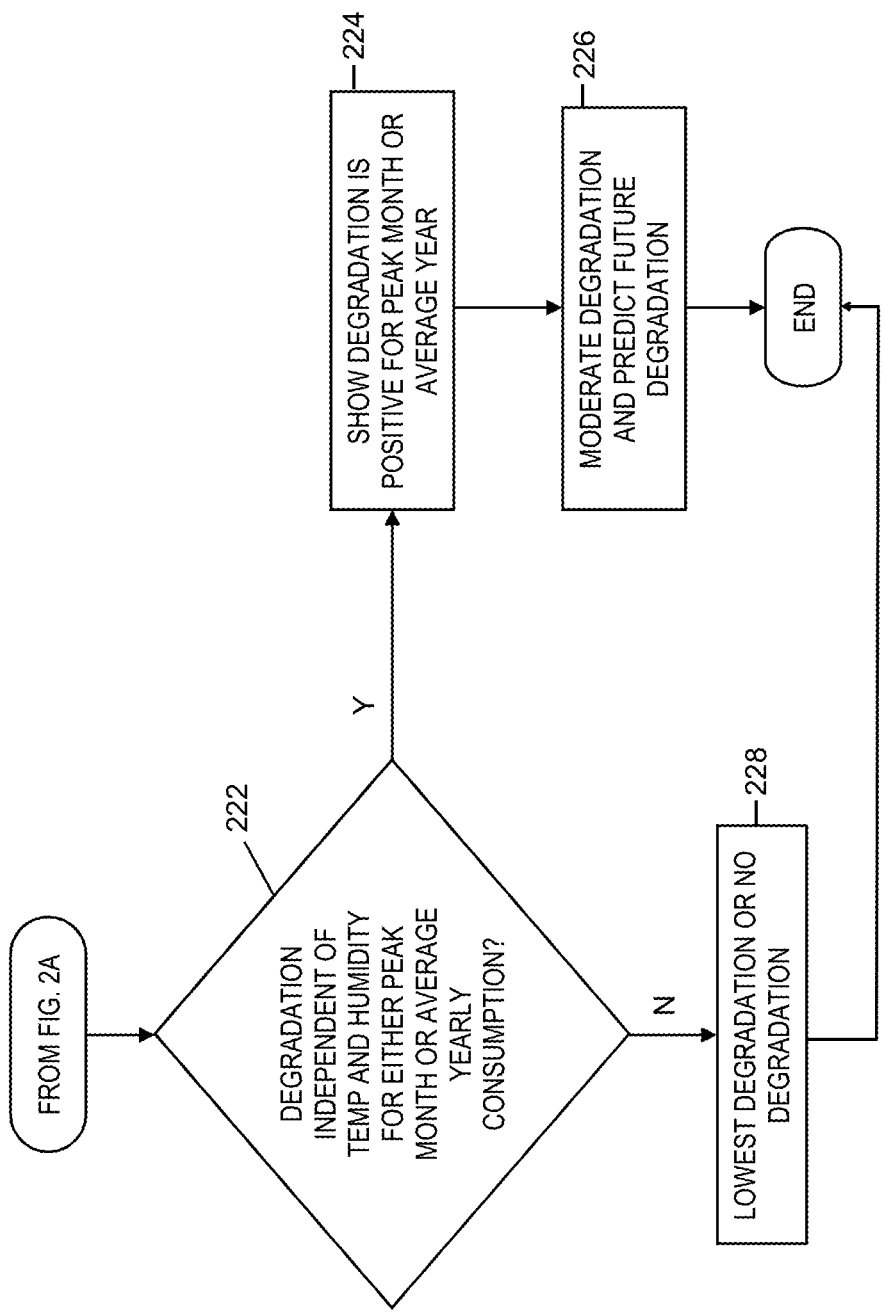

FIGS. 2A and 2B collectively depict an example process for detecting time-based degradation of a heating/cooling appliance based on power consumption patterns of active power, in accordance with aspects described herein. In some examples, one or more aspects of FIGS. 2A and 2B are performed by a computer system, such as a computer system that is or provides analytics engine 114. Additionally, as noted, in some examples this process is performed on a device-by-device basis, i.e. for each electrical device of potentially several in the building 102.

The process obtains data from meter/IHD device(s) (202) then parses and aggregates the data as necessary to remove outliers (204). Further aspects of this parsing/aggregating are described below under the Parse, Aggregate, and Remove Outliers section. The process analyzes the impact of temperature, humidity and energy consumption over multiple years (206). Although the time period used in examples describe herein are years, the period of time could be any desired period, shorter or longer than a year. Aspects of analysis 206 are described below under the Trend Analysis section. The process continues with data preparation (208), including (i) identifying a warmest month per each year and comparing year-over-year energy consumption for that peak month along with temperature and humidity conditions; (ii) calculating an average monthly energy consumption, average temperature, and humidity for each year; and (iii) comparing (i) and (ii) on a year-over-year basis. Aspects of data preparation 208 are described below under the Data Preparation section. Based on the data preparation, the process continues with aspects described below under the Analysis of Variance section. Specifically, the process determines whether there is an increasing trend of energy consumption over the years (210). If not (210, N), it means there is no (or a negligible amount) of degradation seen with the appliance (212) and the process ends. Otherwise, if an increase in power consumption during the relevant timeframe (e.g. the multiple years) is observed (210, Y), the process continues with (in this example) a multivariate analysis (214) for items (i) and (ii) of the data preparation 208. As part of this, different factor (operating parameter) combinations are compared to identify the statistically significant variables.

Based on the analysis 214, the process determines (e.g. based on a statistical t- or f-value and confidence level) whether the analysis reflects an increase in energy due to time decay independent of temperature and humidity for both peak-monthly and average readings (216). If so (216, Y), the process indicates that degradation of the appliance is positive for peak-month and average year (218). The process reflects 'highest degradation' and predicts future degradation using, e.g., linear regression (220), then ends. In this regard, it is noted that this is not necessarily a reflection that the device is degrading faster than normal or expected. Instead, it is an indication that time (aging) is the most statistically-significant variable or factor in the degradation of the device.

If instead at 216 it is determined that the analysis does not reflect an increase in energy due to time decay independent of temperature and humidity for both peak-monthly and average readings (216, N), the process continues (to FIG. 2B) to determine (e.g. based on a statistical t- or f-value and confidence level) whether the analysis reflects degradation independent of temperature and humidity for either peak-month or average yearly consumption (222). If so (222, Y), the process indicates that degradation of the appliance is positive for peak-month or average year (224). The process reflects 'moderate degradation' and predicts future degradation (226), e.g. using linear regression, then ends. It is noted again that this is not necessarily a reflection that the device is degrading faster than normal or expected. Instead, it is an indication that time (aging) is a statistically-significant variable or factor in the degradation of the device, together with other factor(s).

Otherwise, if at 222 it is determined that the analysis does not reflect degradation independent of temperature and humidity for either peak-month or average yearly consumption (222, N), the process continues by reflecting lowest or no degradation (228) and ends. In this regard, it reflects that temperature and/or humidity are more significant contributors to device degradation than aging of the device.

Parse, Aggregate & Removing Outliers:

The parsing, aggregation, and outlier removal can proceed as follows:

1. Let T be timestamp (e.g. day, month, year) of the active energy consumed (kWh) since the last timestamped data value.

2. Let E be that active energy consumed (in kWh).

3. Separate timestamp for data, month, and year into separate columns. Remove the outlier timestamp data values based on data from sensors, e.g. when number of occupants in room, zone or building is sensed to be relatively high (relative to normal), when a window or door sensor indicates a window or door is open, thereby potentially stressing the heating or cooling appliance, etc. In other words, this identifies what data should be considered outliers on the basis that a window or door was open, or there was a surge of occupants in the building, as examples, which would all reflect a spike in consumption but not due to device degradation.

4. Obtain the ambient temperature of the environment (e.g. the outside environment in which the building is located) from a resource such as a weather website. In other words, obtain temperature readings of the ambient (outside) environment.

5. Group, by month, the energy consumed by the electrical device. In some embodiments, devices are considered in aggregate by device type/class, e.g. air conditioning unit(s), heating units, etc., in which case the data may be aggregated by device type/class. Additionally or alternatively, in some embodiments the grouping by month means group the January consumption across multiple years, February consumption across the multiple years, etc.

6. For each year, calculate the peak monthly and monthly average energy consumption.

Trend Analysis:

Trend Analysis is conducted by plotting points between energy consumption month-over-month over multiple (e.g.

3-4) years and similarly the overall relation between temperature and energy consumption month-over-month (over 3-4 years). This is also performed for the relation between humidity and energy consumption month-over-month.

Figure 4:
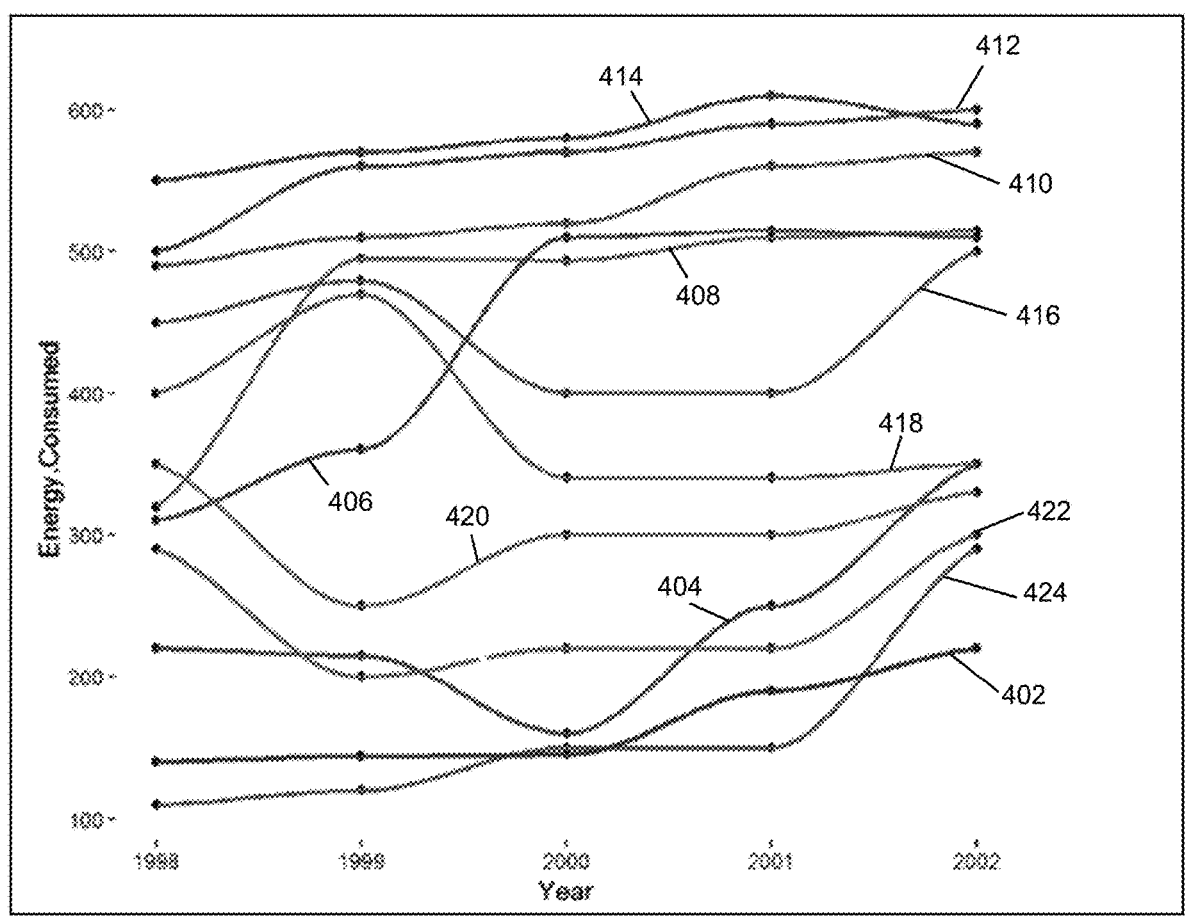
FIG. 4 depicts an example graph illustrating trends, by-month, in energy consumed by an electrical device across multiple years.

FIG. 4 depicts an example graph illustrating trends, by-month, in energy consumed by an electrical device across multiple (5) years. Lines indicated by reference numerals 402-424 are paired with the twelve months of the year as follows: 402—January; 404—February; 406—March; 408—April; 410—May; 412—June; 414—July; 416—August; 418—September; 420—October; 422—November; 424—December. The graph shows fluctuations in energy consumed both (i) across months within a given year, and (ii) across years, for each given month.

Figure 9:
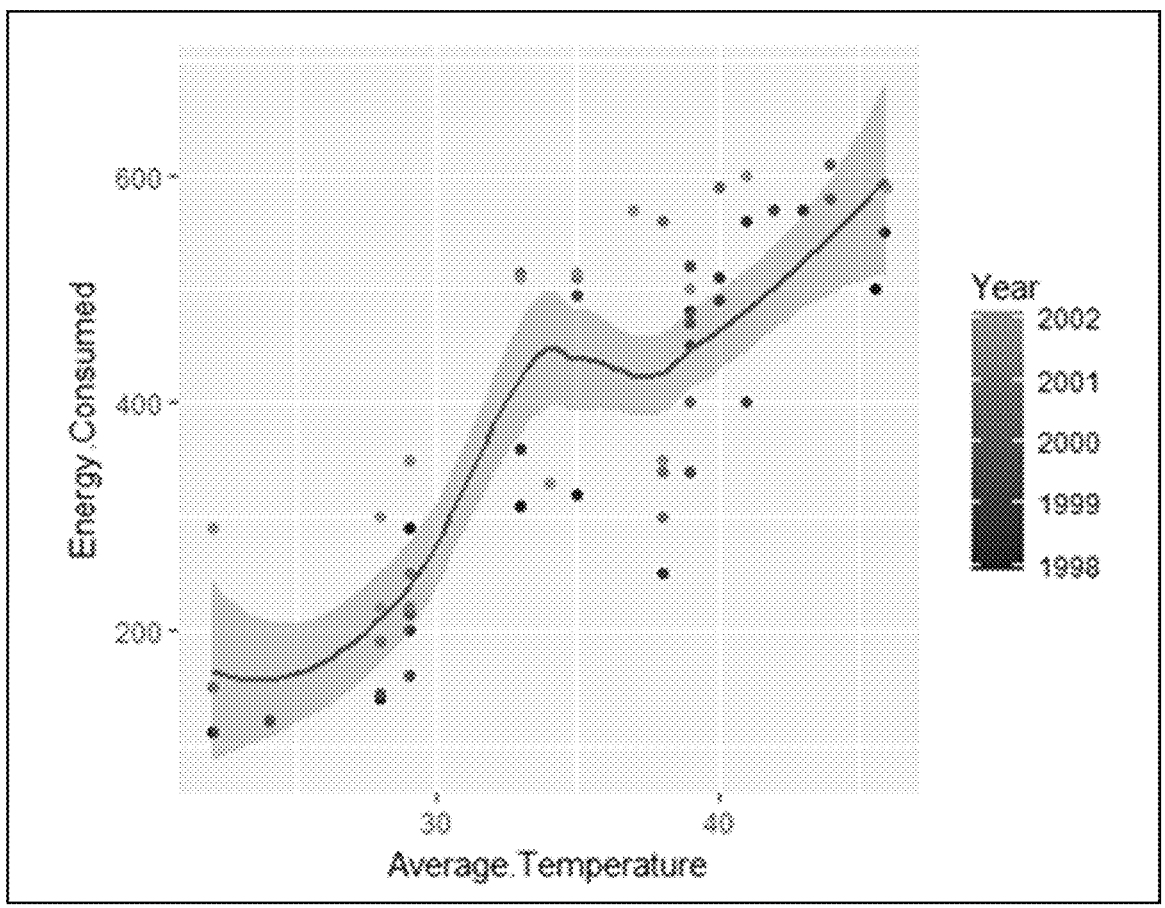

FIG. 9 depicts a graph showing a trend in change of energy consumption with temperature across the multiple years. This shows that as time across years 1998 to 2002, the device generally consumes progressively greater energy, and there is a direct relationship to temperature that holds across a range of temperatures spanning about 25 units to about 46 units.

Data Preparation:

The data preparation prepares the data for the multivariate analysis. To provide a year-over-year comparison for a desired time period, the data can be grouped as illustrated in the following table. This grouping is done by month in this example, but grouping by other time periods, such as by season, may be used.

| Month | Year | Average Ambient Temperature for month | Average Energy Consumption for Peak Month |
|---|---|---|---|
| Mn (nth month of Year 1) | Y1 | T1 | e1(Mn, Y1) |
| Mn (nth month of Year 2) | Y2 | T2 | e2(Mn, Y2) |
| Mn (nth month of Year 3) | Y3 | T3 | e3(Mn, Y3) |

In the example above, the peak energy consumption in each year happens to be the same (nth) month each year, though in other examples the month of peak consumption varies across the years. The average ambient temperature for the month is determined based on daily average temperature across the month, as is the average energy consumption for the peak month.

The following table depicts a creation of average monthly energy consumption for a heating/cooling appliance across three years:

| Year | Average Ambient Temperature for Year | Average Monthly Energy Consumption for Respective Years |
|---|---|---|
| Y1 | T1Y | E1(Y1) |
| Y2 | T2Y | E2(Y2) |
| Y3 | T3Y | E3(Y3) |

In the above table, T1Y is the average ambient temperature for that year (e.g. Y1). It is noted that if humidity readings were part of these examples, the table could have another column for H1Y, H2Y, and H3Y Below is an example simulated dataset for year-over-year consumption in peak month of July:

| | Year | Month | Energy Consumed | Average Temperature | Average Humidity |
|---|---|---|---|---|---|
| 1 | 1998 | July | 550 | 45.9 | 64 |
| 2 | 1999 | July | 570 | 43.0 | 54 |
| 3 | 2000 | July | 580 | 44.0 | 56 |
| 4 | 2001 | July | 610 | 44.0 | 64 |
| 5 | 2002 | July | 590 | 46.0 | 65 |

Figure 6:
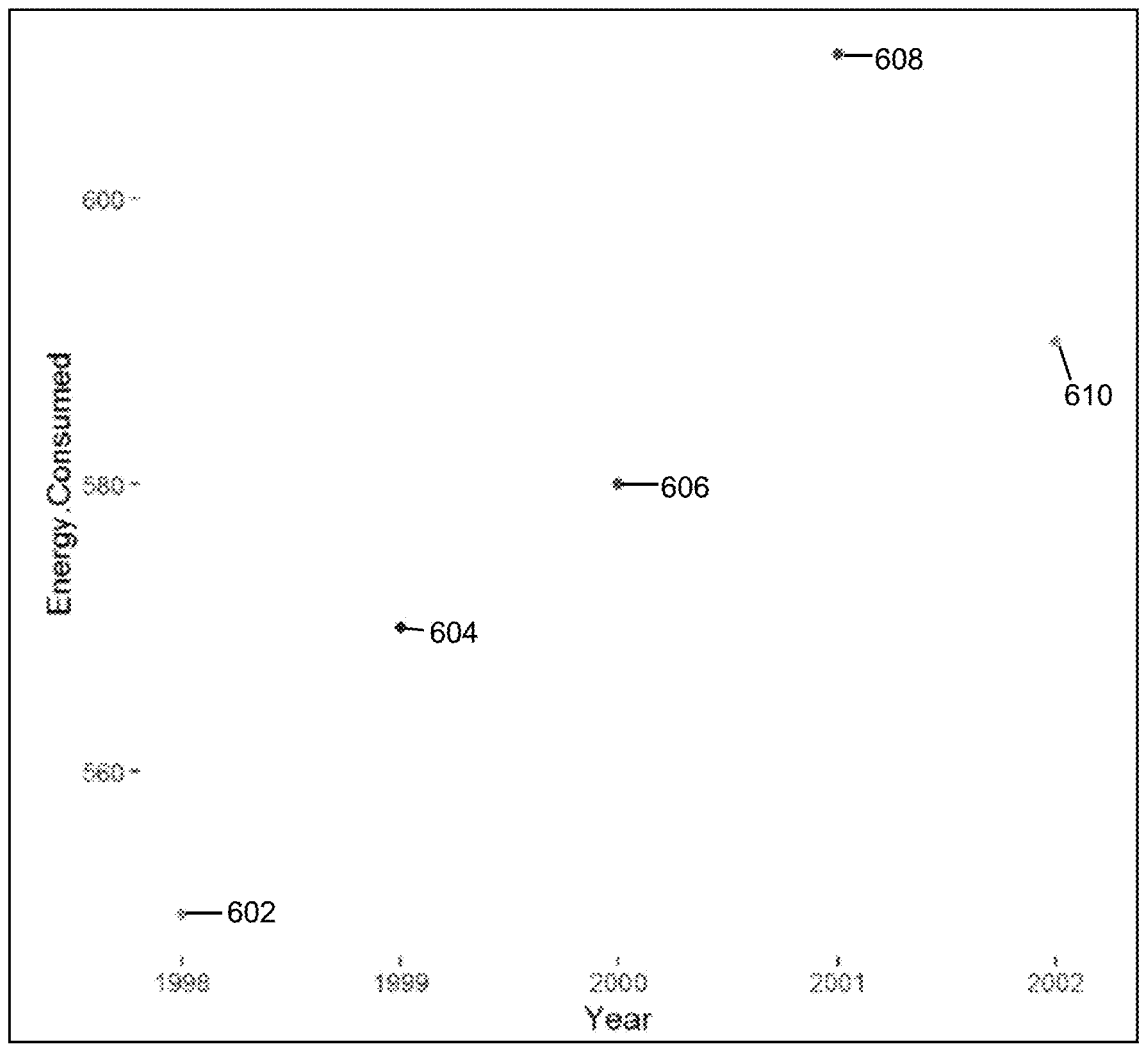

The simulated dataset in the preceding table is reflected in FIG. 6, showing a graph of the average monthly energy consumption and temperature for peak month July across years 1998-2002. Data points indicated by reference numerals 602-610 represent energy consumed (y-axis) in the given year (x-axis) and incorporate shading to illustrate average temperature for that year, i.e. 602—1998 (avg. July temp 45.9); 604—1999 (avg. July temp 43.0); 606—2000 (avg. July temp 44.0); 608—2001 (avg. July temp 44.0; 610—2002 (avg. July temp 46.0).

Figure 7:
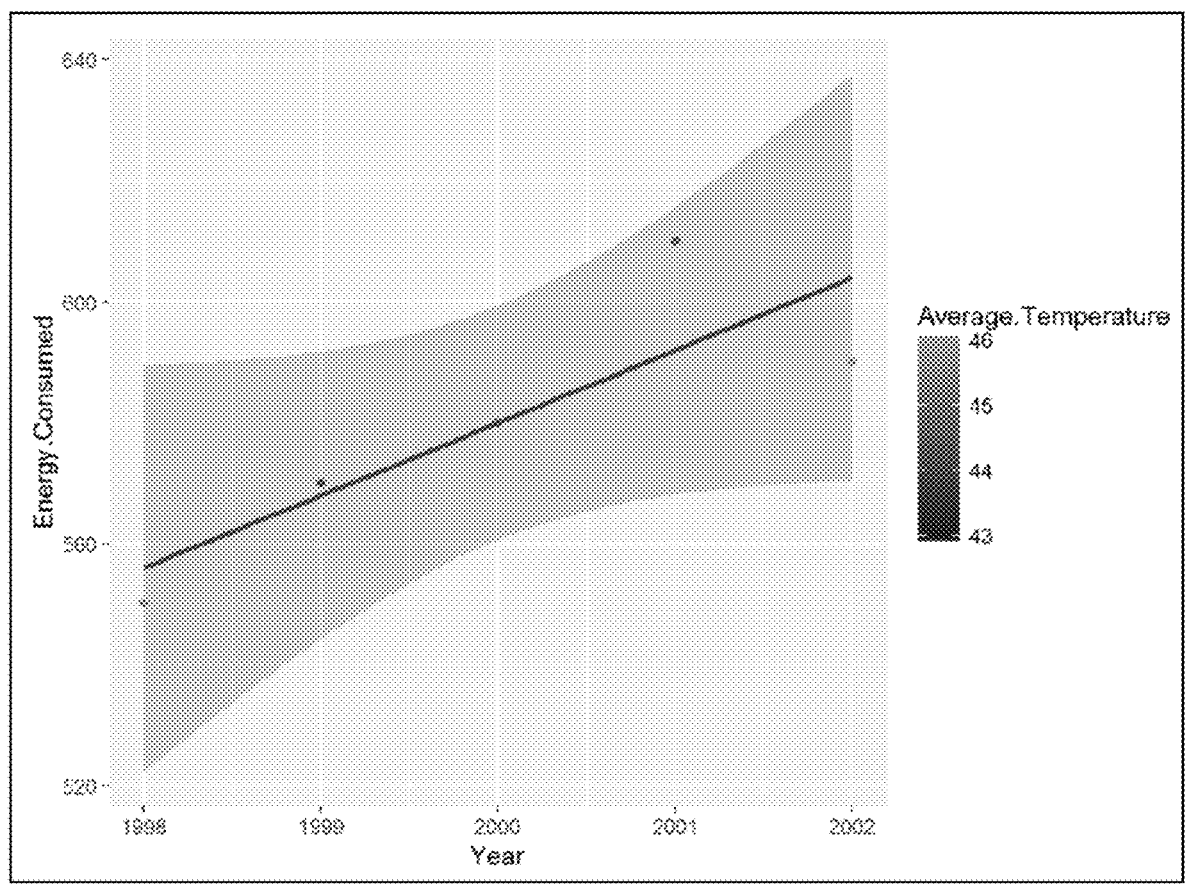

FIG. 7 presents a graphical representation of year-over-year comparison of average monthly consumption for peak month July, similar to FIG. 6, except with a regression line clearly showing that there is an increase in energy consumption for the device on a year-by-year basis.

Analysis of Variance (ANOVA):

An objective of the Analysis of Variance is to compare and analyze whether there is an increase in, e.g., average monthly and/or peak month, active power consumption over the years and assess whether this increase is due to operating parameters, such as temperature and/or humidity, and/or device degradation.

A process can perform the multivariate analysis after determining that an increase in energy consumption over the years has been observed in the first place. Referring to FIG. 2A, it is determined at 210 whether an increase is observed and, if not, then it concludes that no degradation is seen (212). Otherwise, the process performs the multivariate analysis (214), after confirming that an increase in consumption was observed (210, Y). As part of the multivariate analysis, it can compare different factor combinations to determine which one or more factors are statistically significant and the extent to which factors are correlated. In the examples described herein, the multivariate analysis indicates whether temperature, humidity, or possibly both are statistically significant such that they have contributed to the increase in energy consumption.

In an example methodology, a process performs a two-way analysis of variance (ANOVA) testing to reject or pass hypotheses for year-wise energy consumption and for warmest/coolest (e.g. peak) month consumption. Below are example hypotheses:

1. $H_0$—There is no impact of time on active energy consumption;

2. $H_1$—There is no impact of ambient temperature on active energy consumption for that month;

3. $H_2$— There is no impact of either average ambient temperature or time;

4. $H_3$— There is no impact of humidity;

5. $H_4$— There is no impact either due to humidity or temperature or both.

Using 95% confidence level and using df(m,z) where m and z are individual degrees of freedom, determine sum of square of Energy Consumption.

|  | Sum of Square | df | Mean Square | F-score |
|---|---|---|---|---|
| Sum of Square of Year |  | p |  | X |
| Sum of Square of Temperature |  | q |  | Y |
| Sum of Square within |  | r |  | Z |
| Sum of Square of Both Factors |  | t |  | M |

In case F-score of year is more than the table value, we can reject the $H_0$ hypothesis:

F square=Between Group Variability/Variance within group:

$$\text{Between group Variability} = \sum_1^n \frac{(e_{iav} - E_{IAV})^2}{K - 1}$$

$e_{iav}$ denotes mean for the data in the group
$E_{IAV}$ denotes mean of all the data
$(e_{ij})$=value of i th observation jth group
K denotes the number of Group Within Group Variability=$\Sigma_{i=1}^{k}\Sigma_1^n(e_{ij}-e_{av})^2/(N-K)$ Df(p,t)=X>Xo. We can reject the hypothesis moderate degradation if t-value for Ho>H1, else show low degradation.

The following table depicts example multivariate analysis results for year-over-year peak monthly consumption:

|  | Df | Sum Sq. | Mean Sq. | F value | Pr(>F) |
|---|---|---|---|---|---|
| HumidLocation3$Year | 1 | 1440.0 | 1440.0 | 31.779 | .112 |
| HumidLocation3$Average.Temperature | 1 | 252.6 | 252.6 | 5.576 | .255 |
| HumidLocation3$Average.Humidity | 1 | 262.0 | 262.0 | 5.783 | .251 |
| Residuals | 1 | 45.3 | 45.3 |  |  |

The following table depicts example multivariate analysis results for year-over-year average monthly consumption:

|  | Df | Sum Sq. | Mean Sq. | F value | Pr(>F) |
|---|---|---|---|---|---|
| Humverage$Year | 1 | 3519 | 3519 | 23.507 | .129 |
| Humverage$Average.Temperature | 1 | 130 | 130 | .866 | .523 |
| Humverage$Average.Humidity | 1 | 155 | 155 | 1.037 | .494 |
| Residuals | 1 | 150 | 150 |  |  |

In the above, the P value is least for year (first row), meaning a relatively significant cause of degradation is time (i.e. aging of the device), rather than temperature and humidity. Though not shown in the tables above, the analysis can also include an assessment of the combination of temperature and humidity (like would be done for passing or rejecting H4 above).

Linear Regression Model for Future Predictability of Degradation: Use Regression model to predict future degradation and calculate slope for each independent variable and their importance from t test.

With historic data about the device's consumption and an indication that the device is degrading with age, linear regression (or any other desired statistical approach) is used to predict future consumption of the device. This refers to a schedule of predicted future degradation attributable to further time-based degradation of the device, providing the customer with a sense of how the equipment is expected to degrade. The prediction can predict not only future degradation, but also a correlated presumed energy consumption, and therefore the cost to operate the equipment, based on the rate of degradation and predicted consumption levels.

Using a linear regression model, the following mathematical equations can be used to create & predict the monthly energy or monthly time consumed for future: e(future)=a+b*t, i.e. 'Future energy is equal to a function of a (intercept/constant) and b, the slope.

$$b = \frac{\sum_{i=0}^n (e, t) - \left(\sum_1^n e \sum_1^n t\right)}{\sum_1^n t^2 - \left(\sum_1^n t\right)^2} = s_{et}/s_{tt}$$

total Sum of Squares =

$$s_e = \sum_i^n (e_i - e_{av})^2 = \text{Sum of Error} = s_E = \sum_i^n (e_i - e_P)^2$$

$$\text{Sum of Error} = ss_{tt} = \sum_i^n (t_i - t_{av})^2$$

$$ss_{et} = \sum_i^n (t_i - t_{av})(e_i - e_{av})$$

$t_{av}$ = Average $t$ value, $e_{av}$ = mean of $e$ value $t_i$- $i$th value of $t$, $e_i$ = $i$ the value of $e$ $a = y(\text{mean}) - bx(\text{mean})y(\text{mean}) - bx(\text{mean})$ $$\text{Error of intercept} = s\sqrt{\frac{1}{n} + \frac{\overline{t_{av}^2}}{ss_{tt}}}$$

$$\text{Error of slope} = \frac{s}{\sqrt{ss_{xtt}}}$$

$$s = \frac{s_E}{n-2} = \text{standard Deviation } e(t)$$

Hypothesis checking for Linear regression model –

Null hypothesis slope = 0

Alternate Hypothesis $H_0$ not equal to zero $$\text{Calculate the } t \text{ value} = \frac{r\sqrt{n-2}}{\sqrt{1-r^2}} \frac{r\sqrt{n-2}}{\sqrt{1-r^2}}.$$

Calculate the t-value to check if regression model slope is correct. Hence, average time taken by the degraded equipment = $e(t)$/Power Hence $m = a + bt$ Using the above linear regression model—calculate the final (energy consumed for device) analysis:

$e(t)=a+b(t)$

E=Energy consumed as a function of time (years) (based on equipment's linear data)

t=time consumed

Levels of Degradation:

The table below presents a comparison of levels of degradation based on the multivariate ANOVA testing. In other words, each of the rows represents a respective different scenario of passing/failing hypotheses. F1 represents degradation due to time, F2 represents degradation due to temperature, and F3 represents degradation due to humidity. This table may be specific to the peak month analysis, average monthly analysis, or an aggregate of both. In this example, whether a given hypotheses passes is based on a configurable aggregation of (i) the analysis of average monthly consumption data, (ii) the analysis of peak monthly consumption data, and (iii) t-Test of Linear Regression model for Computing Energy Consumption using Monthly average for each year. Note that in t-test there are 3 dependent variables—Year, Temperature and Humidity, and hence H3,H4,H5,H6 would not be valid.

|  | H0<br>F1 | H1<br>F2 | H2<br>F3 | H3<br>F1*F2 | H4<br>F1*F3 | H5<br>F2*F3 | H6<br>F1*F2*F3 | Result |
|---|---|---|---|---|---|---|---|---|
| Test Results | Reject | Pass | Pass | Pass | Pass | Pass | Pass | Strong candidate for degradation |
| Test Results | Reject | Pass | Pass | Pass | Reject | Pass | Reject | Strong candidate for degradation |
| Test Results | Reject | Pass | Pass | Pass | Reject | Pass | Pass | Strong candidate for degradation |
| Test Results | Reject | Reject | Pass | Pass | Pass | Pass | Reject | Moderate Degradation |
| Test Results | Reject | Reject | Pass | Reject | Pass | Pass | Reject | Moderate degradation if t-value for $H_0 > H_1$, else show degradation |
| Test Results | Reject | Reject | Pass | Reject | Pass | Pass | Reject | Moderate Degradation |
| Test Results | Pass | Pass/Reject | Pass/Reject | Pass/Reject | Pass/Reject | Pass/Reject | Pass/Reject | Low degradation |

As an example, the Analysis of Variance may indicate the scenario of the first row in the table above, in which $H_0$ is rejected but $H_1$ to $H_6$ all pass. The particular appliance being assessed in that case is deemed to be a strong candidate for degradation (based on average and peak monthly consumption), meaning aging of the device has a statistically significant impact on the increase in energy consumption.

Figure 5:
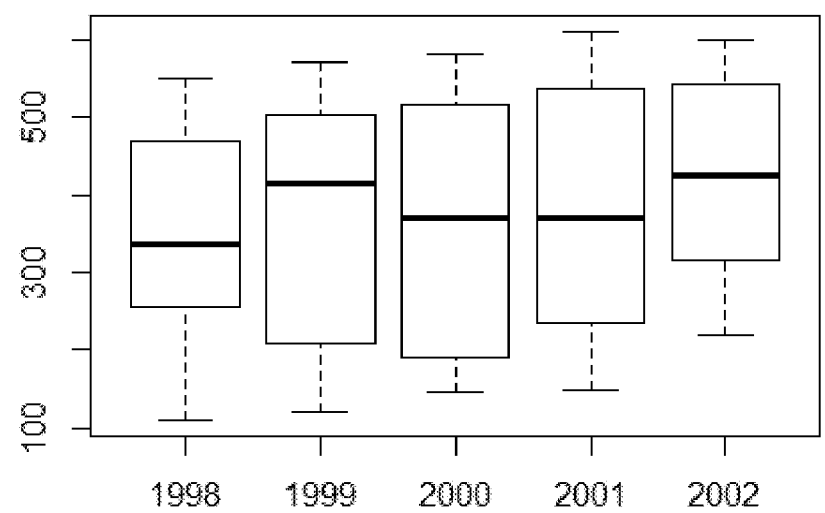
FIGS. 5-10 depict data graphs from a simulated detection of time-based degradation of a heating/cooling appliance based on power consumption patterns of active power, in accordance with aspects described herein.

The following presents an example simulated dataset and corresponding calculations and output of the model using 'R.' (an open source programming language and software environment for statistical computing), according to aspects described herein:

[[BEGIN SIMULATION]]
setwd("~/Research/DIR")
HumidLocation<-read.csv("~/Research/DIR/HumidLocation.csv")
View(HumidLocation)
library(dplyr)
Attaching package: 'dplyr'
The following objects are masked from 'package: stats':

filter, lag
The following objects are masked from 'package: base':

intersect, setdiff, setequal, union library(tidyr)
library(ggplot2)
boxplot(HumidLocation$Energy.Consumed~HumidLocation$Year)
[Refer to FIG. 5 for output.]
HumidLocation2<-HumidLocation %>% filter(Average.Temperature>41& Average.Humidity>50)
print(HumidLocation2)

| ## | Year | Month | Energy.Consumed | Average.Temperature | Average.Humidity |
|---|---|---|---|---|---|
| ## 1 | 1998 | June | 500 | 45.6 | 66 |
| ## 2 | 1998 | July | 550 | 45.9 | 64 |
| ## 3 | 1999 | July | 570 | 43.0 | 54 |
| ## 4 | 2000 | July | 580 | 44.0 | 56 |
| ## 5 | 2001 | July | 610 | 44.0 | 64 |
| ## 6 | 2002 | July | 590 | 46.0 | 65 |

HumidLocation3<-HumidLocation2%>% filter(Month=='July')
print(HumidLocation3)

| ## | Year | Month | Energy.Consumed | Average.Temperature | Average.Humidity |
|---|---|---|---|---|---|
| ## 1 | 1998 | July | 550 | 45.9 | 64 |
| ## 2 | 1999 | July | 570 | 43.0 | 54 |
| ## 3 | 2000 | July | 580 | 44.0 | 56 |
| ## 4 | 2001 | July | 610 | 44.0 | 64 |
| ## 5 | 2002 | July | 590 | 46.0 | 65 | ggplot(HumidLocation3,aes(x=Year, y=Energy.Consumed,col=Average.Temperature))+
geom_point( )
[Refer to FIG. 6 for output.]
Considering Time, Temperature & humidity as Categorical variable and comparing means in each category for each Month & Variance in their group
av3<-aov
(HumidLocation3$Energy.Consumed~HumidLocation3$Year+HumidLocation3$Average.Temperature+HumidLocation3$Average.Humidity)
summary(av3)

| ## | | Df | Sum Sq | Mean Sq | F value | Pr (>F) |
|---|---|---|---|---|---|---|
| ## | HumidLocation3$Year | 1 | 1440.0 | 1440.0 | 31.779 | 0.112 |
| ## | HumidLocation3$Average.Temperature | 1 | 252.6 | 252.6 | 5.576 | 0.255 |
| ## | HumidLocation3$Average.Humidity | 1 | 262.0 | 262.0 | 5.783 | 0.251 |
| ## | Residuals | 1 | 45.3 | 45.3 | | | model.tables(av3,"means")
Warning in replications(paste("~", xx), data=mf): non-factors ignored:
HumidLocation3$Year
Warning in replications(paste("~", xx), data=mf): non-factors ignored:
HumidLocation3$Average.Temperature
Warning in replications(paste("~", xx), data=mf): non-factors ignored:
HumidLocation3$Average.Humidity
Tables of means
Grand mean

580

HumidLocation3$Year
HumidLocation3$Year
1998 1999 2000 2001 2002
556 568 580 592 604

HumidLocation3$Average.Temperature
HumidLocation3$Average.Temperature
43 44 45.9 46
588.9 583.9 570.5 572.8

HumidLocation3 $Average.Humidity
HumidLocation3$Average.Humidity
54 56 64 65
577.1 571.7 587.8 575.5
Creating Average Data for the year and average time spent per year per device
Humverage<-HumidLocation %>% group_by(Year) % >% summarize_each(funs(mean),Energy. Consumed, Average. Temperature,Average.Humidity)
Humverage
# A tibble: 5×4

| | Year <int> | Energy Consumed <dbl> | Avg. Temp. <dbl> | Avg. Hhumidity <dbl> |
|---|---|---|---|---|
| 1 | 1998 | 344.1667 | 35.29167 | 47.00000 |
| 2 | 1999 | 364.5000 | 34.83333 | 43.83333 |
| 3 | 2000 | 365.7500 | 34.91667 | 38.08333 |
| 4 | 2001 | 386.2500 | 34.41667 | 47.16667 |
| 5 | 2002 | 427.0833 | 34.16667 | 53.91667 |

Timedataframe<-Humverage %>% select(Energy.Consumed) %>% mutate(time=Energy. Consumed/5)
TimeaverageHumidlocation<-left_join(Humverage, Timedataframe, by="Energy.Consumed")
TimeaverageHumidlocation

| | Year <int> | Energy Consumed <dbl> | Avg. Temp. <dbl> | Avg. Hhumidity <dbl> | time <dbl> |
|---|---|---|---|---|---|
| 1 | 1998 | 344.1667 | 35.29167 | 47.00000 | 68.83333 |
| 2 | 1999 | 364.5000 | 34.83333 | 43.83333 | 72.90000 |
| 3 | 2000 | 365.7500 | 34.91667 | 38.08333 | 73.15000 |
| 4 | 2001 | 386.2500 | 34.41667 | 47.16667 | 77.25000 |
| 5 | 2002 | 427.0833 | 34.16667 | 53.91667 | 85.41667 |

Comparing mean in each category of temperature, year, Humidity and their variance for Monthly Average for Each Year
av<-aov(Humverage$Energy.Consumed~Humverage$Year+Humverage$Average. Temperature+Humverage$Average.Humidity)
summary(av)

| ## | | Df | Sum Sq | Mean Sq | F value | Pr(>F) |
|---|---|---|---|---|---|---|
| ## | Humverage$Year | 1 | 3519 | 3519 | 23.507 | 0.129 |
| ## | Humverage$Avg.Temp | 1 | 130 | 130 | 0.866 | 0.523 |
| ## | Humverage$Avg.Hum | 1 | 155 | 155 | 1.037 | 0.494 |
| ## | Residuals | 1 | 150 | 150 | | | model.tables(av,"means")
Warning in replications(paste("~", xx), data=mf): non-factors ignored:
Humverage$Year
Warning in replications(paste("~", xx), data=mf): non-factors ignored:
Humverage$Average.Temperature
Warning in replications(paste("~", xx), data=mf): non-factors ignored:
Humverage$Average.Humidity
Tables of means
Grand mean

377.55

Humverage$Year
Humverage$Year
1998 1999 2000 2001 2002
340.0 358.8 377.6 396.3 415.1

Humverage$Average.Temperature
Humverage$Average.Temperature
34.166 . . . 34.4166 . . . 34.833 . . . 34.9166.
378.7 379.4 384.6 369.0
35.29166 . . .
376.1

Humverage$Average.Humidity
Humverage$Average.Humidity
38.0833 . . . 43.833 . . . 47 47.166 . . .
372.0 372.0 385.0 375.5
53.9166 . . .
383.3
print(TimeaverageHumidlocation)
# A tibble: 5×5

|   | Year <int> | Energy Consumed <dbl> | Avg. Temp. <dbl> | Avg. Hhumidity <dbl> | time <dbl> |
|---|---|---|---|---|---|
| 1 | 1998 | 344.1667 | 35.29167 | 47.00000 | 68.83333 |
| 2 | 1999 | 364.5000 | 34.83333 | 43.83333 | 72.90000 |
| 3 | 2000 | 365.7500 | 34.91667 | 38.08333 | 73.15000 |
| 4 | 2001 | 386.2500 | 34.41667 | 47.16667 | 77.25000 |
| 5 | 2002 | 427.0833 | 34.16667 | 53.91667 | 85.41667 | print(Timedataframe)
# A tibble: 5×2

Figure 8:
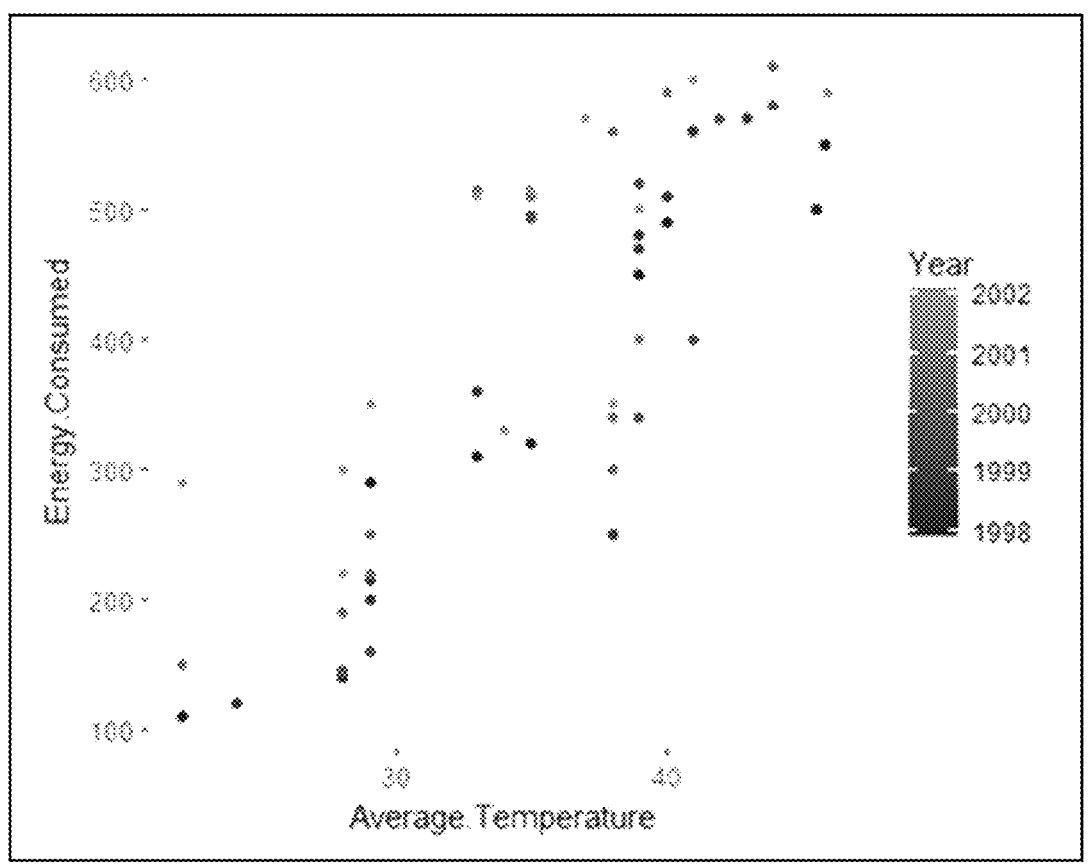
Figure 10:
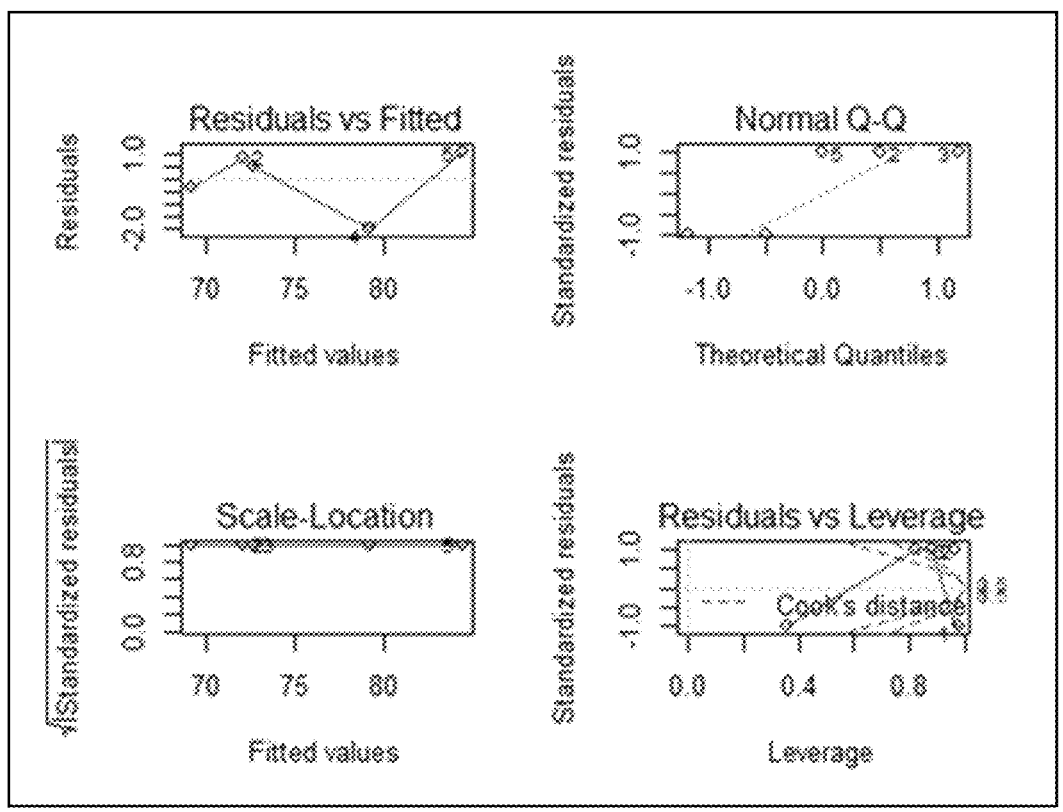

|   | Energy Consumed <dbl> | time <dbl> |
|---|---|---|
| 1 | 344.1667 | 68.83333 |
| 2 | 364.5000 | 72.90000 |
| 3 | 365.7500 | 73.15000 |
| 4 | 386.2500 | 77.25000 |
| 5 | 427.0833 | 85.41667 | ggplot(HumidLocation3, aes(x=Year, y=Energy. Consumed, col=Average.Temperature))+geom_point( )+stat_smooth(method="lm",col="red")
[Refer to FIG. 7 for output.]
diaplot<-ggplot(HumidLocation,aes
(x=Average.Temperature, y=Energy. Consumed))
diaplot<-diaplot+geom_point(aes(col=Year))
diaplot
[Refer to FIG. 8 for output.]
diaplot+geom_smooth(aes(col=Year))
'geom_smooth( )' using method='loess'
[Refer to FIG. 9 for output.]
diaplot2<-ggplot(HumidLocation,aes(x=Year, y=Energy.Consumed))+geom_point( )
diaplot2+geom_smooth(aes(col=Month))
[Refer to FIG. 4 for output.]
Regression model for YoY Comparison and comparison with Temperature
par(mfrow=c(2,2))
mod 2=lm(time~Year+Average.Temperature+Average.Humidity,data=TimeaverageHumidlocation)
plot(mod 2)
Warning in sqrt(crit*p*(1−hh)/hh): NaNs produced
Warning in sqrt(crit*p*(1−hh)/hh): NaNs produced
[Refer to FIG. 10 for output]
summary(mod 2)

Call:
lm(formula=time~Year+Average.Temperature+Average.Humidity,
data=TimeaverageHumidlocation)

Residuals:
1 2 3 4 5
−0.3710 0.8396 0.4654−1.9657 1.0317

Coefficients:

|   | Estimate | Std. Error | t value | Pr (>|t|) |
|---|---|---|---|---|
| (Intercept) | −4890.1309 | 6176.1879 | −0.792 | 0.574 |
| Year | 2.5236 | 2.8973 | 0.871 | 0.544 |
| Avg. Temp | −2.7339 | 11.3382 | −0.241 | 0.849 |
| Avg. Hum | 0.2907 | 0.2855 | 1.018 | 0.494 |

Residual standard error: 2.447 on 1 degrees of freedom
Multiple R-squared: 0.9621, Adjusted R-squared: 0.8485
F-statistic: 8.47 on 3 and 1 DF, p-value: 0.2462
[[END SIMULATION]]

Aspects described herein differ from mere appliance classification and power consumption anomaly detection. For example, some approaches use an unsupervised approach to determine anomalies in power consumption by imputing missing data, computing frequency spectrum, dissimilarity, low dimensional embedding and estimating normalized local density. In other examples, power consumption anomalies are identified through differences between real and predicted consumption by applying the two-sigma rule. In contrast, aspects described herein identify anomalies and compare whether, and an extent to which, an increase in power consumption is due to device degradation, as opposed to/in conjunction with variation in a number of operating parameters like temperature, humidity, or door/window open status, number of occupants, etc. Additionally, aspects described herein can identify whether year-wise degradation exists for the device using, e.g., two-way ANOVA testing. It can consider whether humidity and temperature, alone and in combination, have any impact on peak month, year, or both, as independent factors or correlated factors (both temperature and humidity together) by performing multivariate analysis. In case the null hypothesis is rejected, aspects can identify estimated energy average consumed over some future timeframe for the device, using a linear regression model.

Figure 3:
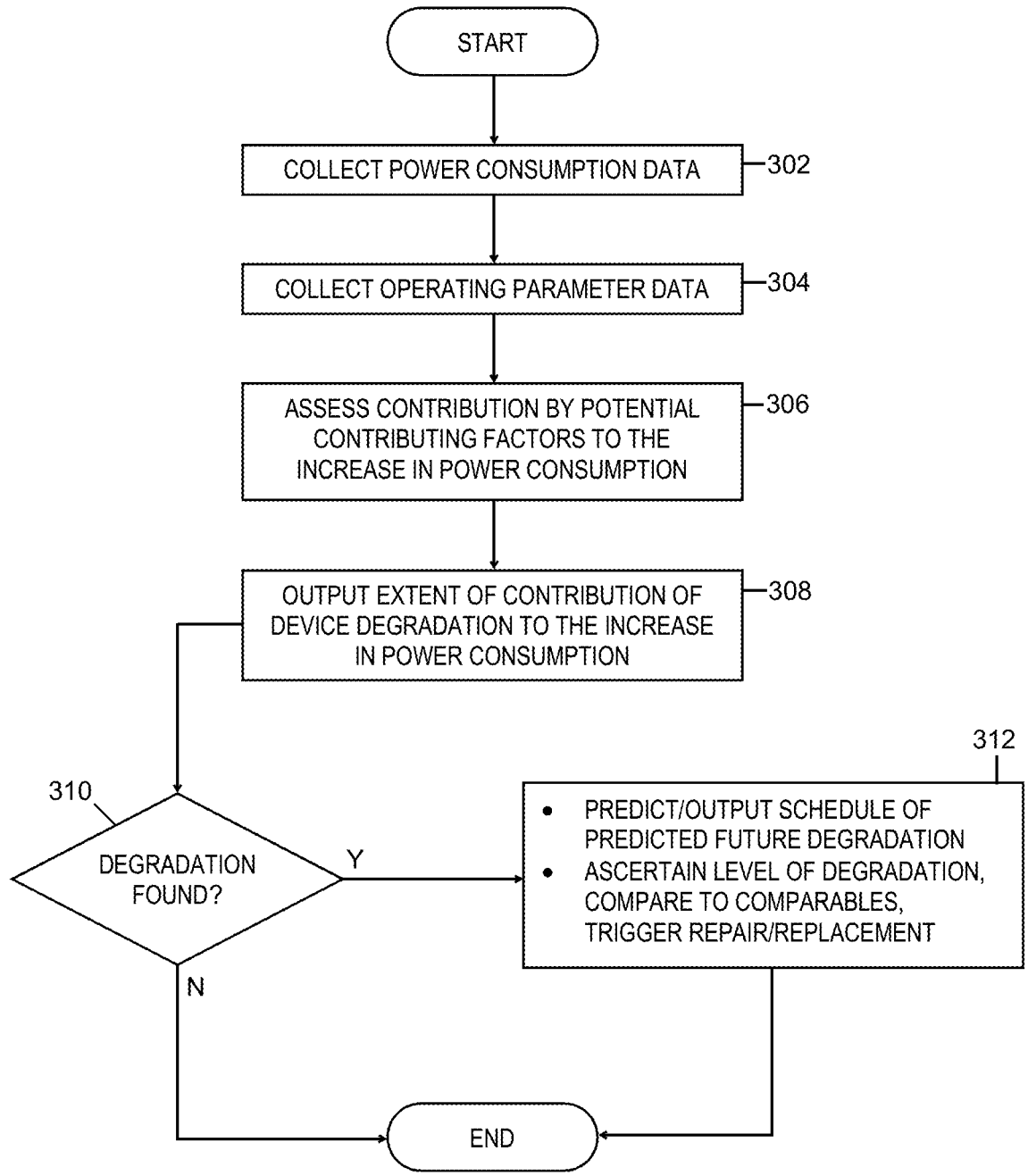
FIG. 3 depicts an example process for electrical device degradation determination, in accordance with aspects described herein.

Accordingly, FIG. 3 depicts an example process for electrical device degradation determination, in accordance with aspects described herein. In some examples, the process is performed by one or more computer systems, such as those described herein, which may include one or more computer systems of or connected to an analytics engine, home energy monitoring system, and/or one of more other computer systems.

The process begins by collecting from at least one power measuring device of an environment, such as a geographic location or building at that location, power consumption data indicating active power consumption during a timeframe by an electrical device in the environment (302). Example power measuring devices include metering devices, sensors, or the like installed in a building or home, as examples. The electrical device can be an HVAC device, for instance a home appliance providing heating, ventilation, and/or air conditioning functions.

The process also collects operating parameter data indicating at least one operating parameter under which the electrical device operates during at least a portion of the timeframe (304). Example operating parameters include local or ambient (i.e. outside of the building) weather conditions (such as temperature and/or humidity), status of doors/windows, and number of occupants in the environment/building, as examples. Thus, the at least one operating parameter can include at least one weather condition of the environment.

In some examples, the at least one operating parameter includes one or more selected operating parameters that are selected from the group consisting of: open/closed status of one or more doors of the building, open/closed status of one or more windows of the building, and number of occupants in the building. Collecting the operating parameter data can include collecting the operating parameter data as sensor events from one or more sensors installed in the building that sense the selected one or more operating parameters.

In some examples, collecting the operating parameter data includes collecting at least some of the operating parameter data from an internet-available resource that provides measurements of operating parameters of the environment. For instance, weather data may be obtained via a weather API, or by harvesting it from a website.

Collecting the power consumption data and the operating parameter data can in some examples include collecting at least some of the power consumption data and at least some of the operating parameter data from a computer system installed in the environment, for instance a HEM system that receives the at least some of the power consumption data and the at least some of the operating parameter data from one or more sensors installed in the environment.

Continuing with the process of FIG. 3, based on observing an increase in power consumption of the electrical device during the timeframe, the process assesses the extents of contribution by potential contributing factors to the increase in power consumption (306). The potential contributing factors can include time-based degradation of the electrical device and the at least one operating parameter for which data was collected. The assessing can consider contribution of degradation of the electrical device to the increase in power consumption independent of contribution of, e.g., the at least one weather condition operating parameter(s) to the increase in power consumption.

The assessing can include eliminating at least one outlier from the power consumption data based on the at least one outlier being a result of an atypical operating parameter status of at least one of the selected one or more operating parameters. For instance, when the sensor data for the door/window/occupants indicates 'atypical' (e.g. window open, door open, large volume of occupants) and that status leads to an outlier in power consumption for the relevant timeframe during which the abnormal status is present, that outlier data can be eliminated.

The process of FIG. 3 then outputs, based on the assessing, an indication of an extent of contribution of degradation of the electrical device to the increase in power consumption (308). In some examples, this output is to another computer system, for instance to a visualization system for a user to view.

This extent of contribution of degradation may be zero. Therefore, the process determines whether time-based degradation was found (310). If not (310, N), then process ends. Otherwise (310, Y), the process proceeds to perform any of various desired actions (312). As an example, the process predicts and outputs a schedule of predicted future time-based degradation. For instance, the timeframe (during which the measured active power consumption occurred) may be an initial timeframe and the process could perform predicting and outputting a schedule of predicted future degradation of the electrical device attributable to further electrical device degradation over a future timeframe, where the predicting uses the assessed extent of contribution of degradation of the electrical device to the increase in power consumption during the initial timeframe. Additionally or alternatively, the process could ascertain, based on the assessed extent of contribution of degradation of the electrical device to the increased power consumption, a level of degradation of the electrical device during the timeframe (meaning how much the device degraded during that time. If it degraded a significant amount, it may need to be replaced or repaired. The process could then compare the ascertained level of degradation of the electrical device to an expected level of degradation of the electrical device expected to occur during the timeframe. This expected level could be formed based on data for a same/similar user profile segment, same/similar appliance, same/similar model and specification, etc. The process could then trigger a decision for electrical device replacement or repair based on the comparing indicating that the ascertained level of degradation of the electrical device is abnormal relative to the expected level of degradation. In other words, if the degradation of the device is higher than average or at least some threshold, the process could alert a user, alert a device manufacture tor servicer, automatically reorder a part of device, take any other desired actions.

In some examples, the assessing includes performing a statistical analysis based on hypotheses, where each hypothesis of the hypotheses includes, as at least one variable of the hypothesis, a respective at least one variable selected from the group consisting of: (i) an impact of time, and (ii) an impact of one or more operating parameters of the at least one operating parameter. Thus, each hypothesis can include one (or more) variables drawn from {impact of time, impact of one or more of the operating parameters that are being monitored}.

Based on an indication from the assessing that aging of the device has a statistically significant impact on the increase in energy consumption independent from any impact of any of the one or more operating parameters, the outputting (308) can include indicating at least a moderate extent of contribution of degradation of the electrical device due to device aging. In other words, if aging is a factor independent from weather, etc., then the outputting can indicate moderate or possibly high degradation. When the assessing considers both average peak-month power consumption of the electrical device across a number of years and average monthly consumption across the number of years, and based on the assessing indicating, for both the average peak-month power consumption of the electrical device across the number of years and average monthly consumption across the number of years, that aging of the device has a statistically significant impact on the increase in energy consumption independent from any impact of any of the one or more operating parameters, the outputting can include indicating a high extent of contribution of degradation of the electrical device due to device aging. In other words, if aging is statistically significant independent of weather, etc. and is found to be so across both peak-month over years and average monthly over year, then the level of degradation of the device due to aging may be reflected as 'high'.

Based on an indication from the assessing that aging of the device does not have a statistically significant impact on the increase in energy consumption independent from any impact of any of the one or more operating parameters, the outputting can include indicating at most a low extent of contribution of degradation of the electrical device due to device aging. In this example, aging is not an independently significant factor.

Although various examples are provided, variations are possible without departing from a spirit of the claimed aspects.

Figure 11:
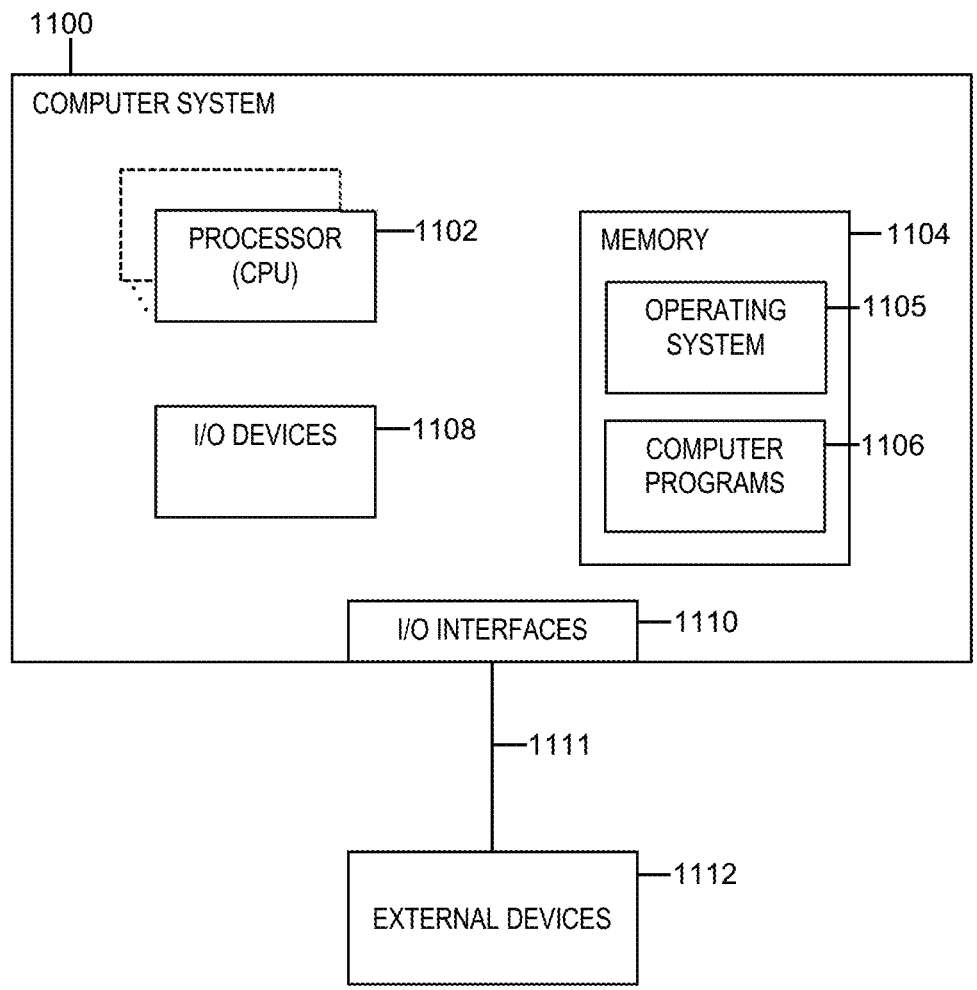
FIG. 11 depicts one example of a computer system and associated devices to incorporate and/or use aspects described herein.
Figure 12:
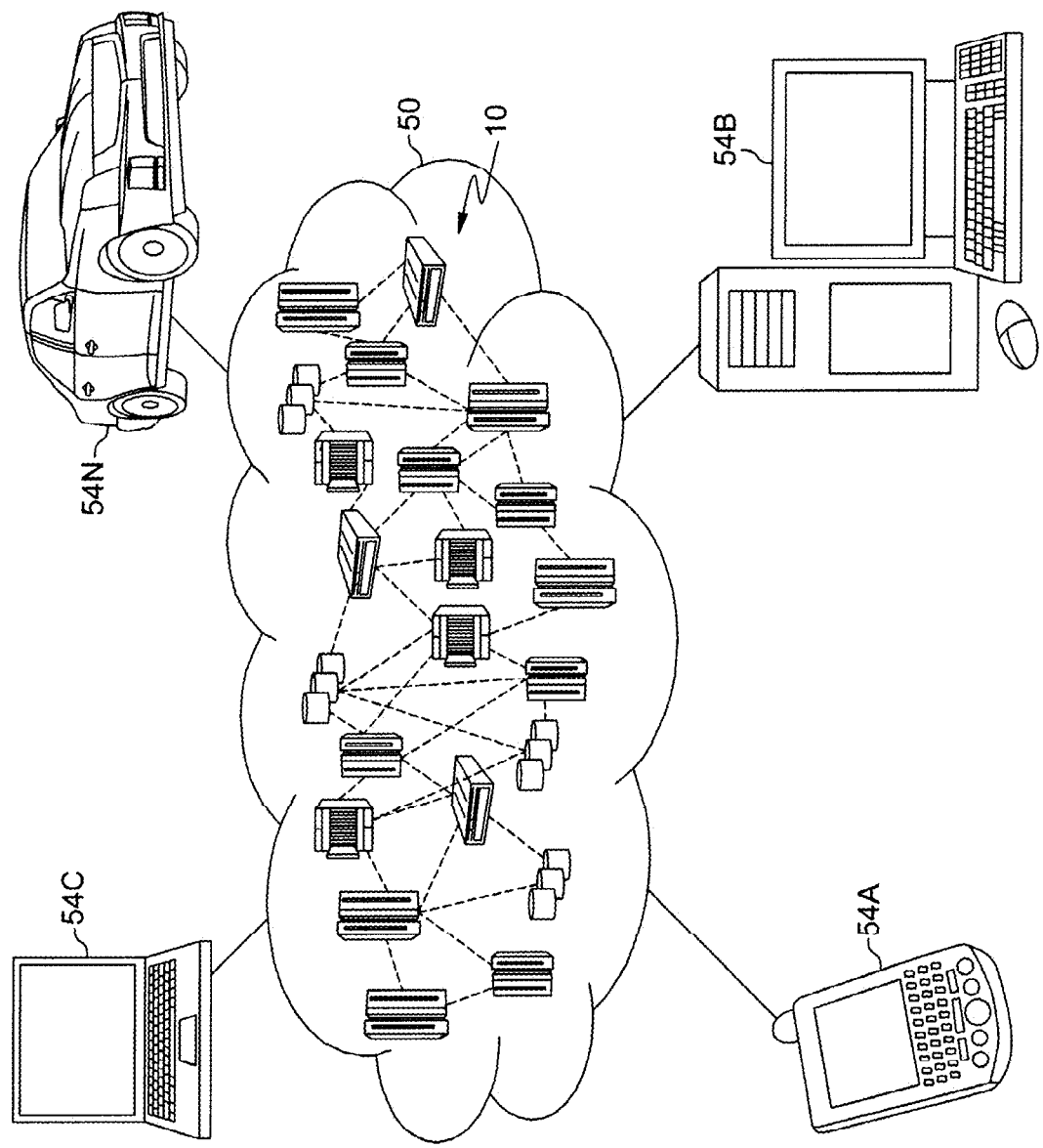
FIG. 12 depicts a cloud computing environment according to an embodiment of the present invention.
Figure 13:
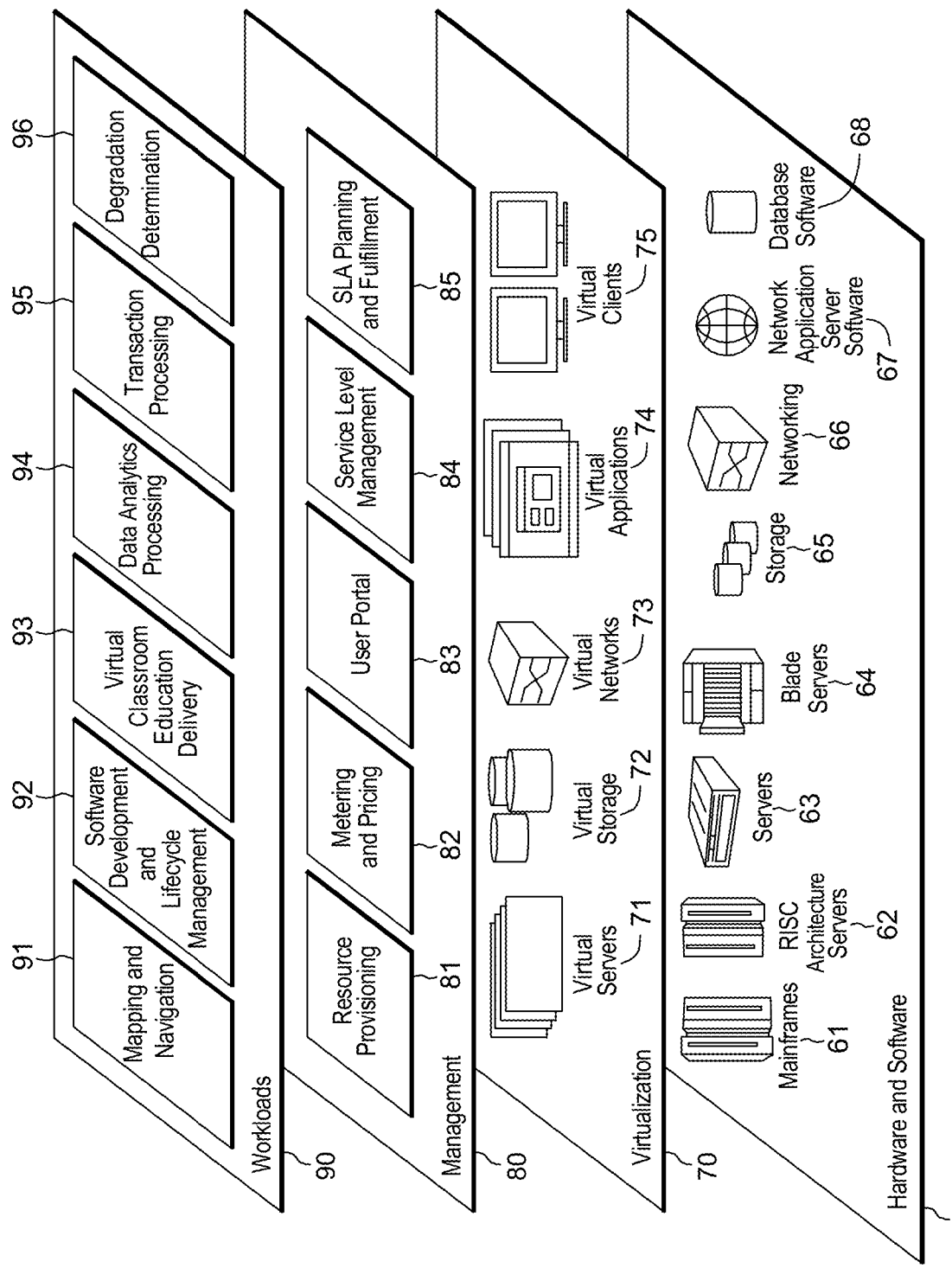
FIG. 13 depicts abstraction model layers according to an embodiment of the present invention.

Processes described herein may be performed singly or collectively by one or more computer systems, such as one or more cloud servers, such as analytics servers, and/or home energy monitoring systems, as examples. FIG. 11 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 11 shows a computer system 1100 in communication with external device(s) 1112. Computer system 1100 includes one or more processor(s) 1102, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1102 can also include register(s) to be used by one or more of the functional components. Computer system 1100 also includes memory 1104, input/output (I/O) devices 1108, and I/O interfaces 1110, which may be coupled to processor(s) 1102 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1104 can be or include main or system memory (e.g. Random Access Memory) used in the execution of program instructions, storage device(s) such as hard drive(s), flash media, or optical media as examples, and/or cache memory, as examples. Memory 1104 can include, for instance, a cache, such as a shared cache, which may be coupled to local caches (examples include L1 cache, L2 cache, etc.) of processor(s) 1102. Additionally, memory 1104 may be or include at least one computer program product having a set (e.g., at least one) of program modules, instructions, code or the like that is/are configured to carry out functions of embodiments described herein when executed by one or more processors.

Memory 1104 can store an operating system 1105 and other computer programs 1106, such as one or more computer programs/applications that execute to perform aspects described herein. Specifically, programs/applications can include computer readable program instructions that may be configured to carry out functions of embodiments of aspects described herein.

Examples of I/O devices 1108 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1112) coupled to the computer system through one or more I/O interfaces 1110.

Computer system 1100 may communicate with one or more external devices 1112 via one or more I/O interfaces 1110. Example external devices include a keyboard, a pointing device, a display, and/or any other devices that enable a user to interact with computer system 1100. Other example external devices include any device that enables computer system 1100 to communicate with one or more other computing systems or peripheral devices such as a printer. A network interface/adapter is an example I/O interface that enables computer system 1100 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1110 and external devices 1112 can occur across wired and/or wireless communications link(s) 1111, such as Ethernet-based wired or wireless connections. Example wireless connections include cellular, Wi-Fi, Bluetooth®, proximity-based, near-field, or other types of wireless connections. More generally, communications link(s) 1111 may be any appropriate wireless and/or wired communication link(s) for communicating data.

Particular external device(s) 1112 may include one or more data storage devices, which may store one or more programs, one or more computer readable program instructions, and/or data, etc. Computer system 1100 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1100 may be operational with numerous other general purpose or special purpose computing system environments or configurations. Computer system 1100 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 16.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Referring now to FIG. 16, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and degradation determination 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
collecting from at least one power measuring device of an environment power consumption data indicating active power consumption during a timeframe by an electrical device in the environment;
collecting operating parameter data indicating at least one operating parameter under which the electrical device operates during at least a portion of the timeframe;
based on observing an increase in power consumption of the electrical device during the timeframe, assessing extents of contribution by potential contributing factors to the increase in power consumption, the potential contributing factors comprising time-based degradation of the electrical device and the at least one operating parameter;
outputting, based on the assessing, an indication of an extent of contribution of degradation of the electrical device to the increase in power consumption; and
initiating repair or replacement of the electrical device based on the extent of the contribution of degradation of the electrical device.

2. The method of claim 1, wherein the at least one operating parameter comprises at least one weather condition of the environment, wherein the assessing considers contribution of degradation of the electrical device to the increase in power consumption independent of contribution of the at least one weather condition to the increase in power consumption, and wherein the electrical device comprises a home appliance providing at least one selected from the group comprising: heating, ventilation, and air conditioning.

3. The method of claim 1, wherein the environment comprises a building, wherein the at least one operating parameter comprises one or more selected operating parameters selected from the group consisting of: open/closed status of one or more doors of the building, open/closed status of one or more windows of the building, and number of occupants in the building, wherein collecting the operating parameter data comprises collecting the operating parameter data as sensor events from one or more sensors installed in the building that sense the selected one or more operating parameters, and wherein the assessing comprises eliminating at least one outlier from the power consumption data based on the at least one outlier being a result of an atypical operating parameter status of at least one of the selected one or more operating parameters.

4. The method of claim 1, wherein the assessing comprises performing a statistical analysis based on hypotheses, wherein each hypothesis of the hypotheses includes, as at least one variable of the hypothesis, a respective at least one variable selected from the group consisting of: (i) an impact of time, and (ii) an impact of one or more operating parameters of the at least one operating parameter.

5. The method of claim 4, wherein based on an indication from the assessing that aging of the device has a statistically significant impact on the increase in energy consumption independent from any impact of any of the one or more operating parameters, the outputting comprises indicating at least a moderate extent of contribution of degradation of the electrical device due to device aging.

6. The method of claim 5, wherein the assessing considers both average peak-month power consumption of the electrical device across a number of years and average monthly consumption across the number of years, and wherein based on the assessing indicating, for both the average peak-month power consumption of the electrical device across the number of years and average monthly consumption across the number of years, that aging of the device has a statistically significant impact on the increase in energy consumption independent from any impact of any of the one or more operating parameters, the outputting comprises indicating a high extent of contribution of degradation of the electrical device due to device aging.

7. The method of claim 4, wherein based on an indication from the assessing that aging of the device does not have a statistically significant impact on the increase in energy consumption independent from any impact of any of the one or more operating parameters, the outputting comprises indicating at most a low extent of contribution of degradation of the electrical device due to device aging.

8. The method of claim 1, wherein the timeframe is an initial timeframe and wherein the method further comprises predicting and outputting a schedule of predicted future degradation of the electrical device attributable to further electrical device degradation over a future timeframe, the predicting using the assessed extent of contribution of degradation of the electrical device to the increase in power consumption during the initial timeframe.

9. The method of claim 1, further comprising:
ascertaining, based on the assessed extent of contribution of degradation of the electrical device to the increased power consumption, a level of degradation of the electrical device during the timeframe;
comparing the ascertained level of degradation of the electrical device to an expected level of degradation of the electrical device expected to occur during the timeframe; and
triggering the initiating of the repair or replacement based on the comparing indicating that the ascertained level of degradation of the electrical device is abnormal relative to the expected level of degradation.

10. The method of claim 1, wherein the collecting the power consumption data and the collecting the operating parameter data comprises collecting at least some of the power consumption data and at least some of the operating parameter data from a computer system installed in the environment that receives the at least some of the power consumption data and the at least some of the operating parameter data from one or more sensors installed in the environment.

11. The method of claim 1, wherein collecting the operating parameter data comprises collecting at least some of the operating parameter data from an internet-available resource providing measurements of operating parameters of the environment.

12. A computer system comprising:
a memory; and
a processor in communications with the memory, wherein the computer system is configured to perform a method comprising:
collecting from at least one power measuring device of an environment power consumption data indicating active power consumption during a timeframe by an electrical device in the environment;
collecting operating parameter data indicating at least one operating parameter under which the electrical device operates during at least a portion of the timeframe;
based on observing an increase in power consumption of the electrical device during the timeframe, assessing extents of contribution by potential contributing factors to the increase in power consumption, the potential contributing factors comprising time-based degradation of the electrical device and the at least one operating parameter;
outputting, based on the assessing, an indication of an extent of contribution of degradation of the electrical device to the increase in power consumption; and
initiating repair or replacement of the electrical device based on the extent of the contribution of degradation of the electrical device.

13. The computer system of claim 12, wherein the environment comprises a building, wherein the at least one operating parameter comprises at least one weather condition of the environment as well as one or more selected operating parameters selected from the group consisting of: open/closed status of one or more doors of the building, open/closed status of one or more windows of the building, and number of occupants in the building, wherein collecting the operating parameter data comprises collecting the operating parameter data as sensor events from one or more sensors installed in the building that sense the selected one or more operating parameters, wherein the assessing comprises eliminating at least one outlier from the power consumption data based on the at least one outlier being a result of an atypical operating parameter status of at least one of the selected one or more operating parameters and the assessing considers contribution of degradation of the electrical device to the increase in power consumption independent of contribution of the at least one weather condition to the increase in power consumption, and wherein the electrical device comprises a home appliance providing at least one selected from the group comprising: heating, ventilation, and air conditioning.

14. The computer system of claim 12, wherein the assessing comprises performing a statistical analysis based on hypotheses, wherein each hypothesis of the hypotheses includes, as at least one variable of the hypothesis, a respective at least one variable selected from the group consisting of: (i) an impact of time, and (ii) an impact of one or more operating parameters of the at least one operating parameter.

15. The computer system of claim 14, wherein the assessing considers both average peak-month power consumption of the electrical device across a number of years and average monthly consumption across the number of years, wherein based on an indication from the assessing that aging of the device has a statistically significant impact on the increase in energy consumption independent from any impact of any of the one or more operating parameters and based on the assessing indicating, for both the average peak-month power consumption of the electrical device across the number of years and average monthly consumption across the number of years, that aging of the device has a statistically significant impact on the increase in energy consumption independent from any impact of any of the one or more operating parameters, the outputting comprises indicating a high extent of contribution of degradation of the electrical device due to device aging.

16. The computer system of claim 12, wherein the method further comprises:
    ascertaining, based on the assessed extent of contribution of degradation of the electrical device to the increased power consumption, a level of degradation of the electrical device during the timeframe;
    comparing the ascertained level of degradation of the electrical device to an expected level of degradation of the electrical device expected to occur during the timeframe; and
    triggering the initiating of the repair or replacement based on the comparing indicating that the ascertained level of degradation of the electrical device is abnormal relative to the expected level of degradation.

17. A computer program product comprising:
    a computer readable storage medium readable by a processor and storing instructions for execution by the processor for performing a method comprising:
        collecting from at least one power measuring device of an environment power consumption data indicating active power consumption during a timeframe by an electrical device in the environment;
        collecting operating parameter data indicating at least one operating parameter under which the electrical device operates during at least a portion of the timeframe;
        based on observing an increase in power consumption of the electrical device during the timeframe, assessing extents of contribution by potential contributing factors to the increase in power consumption, the potential contributing factors comprising time-based degradation of the electrical device and the at least one operating parameter;
        outputting, based on the assessing, an indication of an extent of contribution of degradation of the electrical device to the increase in power consumption; and
        initiating repair or replacement of the electrical device based on the extent of the contribution of degradation of the electrical device.

18. The computer program product of claim 17, wherein the environment comprises a building, wherein the at least one operating parameter comprises at least one weather condition of the environment as well as one or more selected operating parameters selected from the group consisting of: open/closed status of one or more doors of the building, open/closed status of one or more windows of the building, and number of occupants in the building, wherein collecting the operating parameter data comprises collecting the operating parameter data as sensor events from one or more sensors installed in the building that sense the selected one or more operating parameters, wherein the assessing comprises eliminating at least one outlier from the power consumption data based on the at least one outlier being a result of an atypical operating parameter status of at least one of the selected one or more operating parameters and the assessing considers contribution of degradation of the electrical device to the increase in power consumption independent of contribution of the at least one weather condition to the increase in power consumption, and wherein the electrical device comprises a home appliance providing at least one selected from the group comprising: heating, ventilation, and air conditioning.

19. The computer program product of claim 17, wherein the assessing comprises performing a statistical analysis based on hypotheses, wherein each hypothesis of the hypotheses includes, as at least one variable of the hypothesis, a respective at least one variable selected from the group consisting of: (i) an impact of time, and (ii) an impact of one or more operating parameters of the at least one operating parameter, wherein the assessing considers both average peak-month power consumption of the electrical device across a number of years and average monthly consumption across the number of years, wherein based on an indication from the assessing that aging of the device has a statistically significant impact on the increase in energy consumption independent from any impact of any of the one or more operating parameters and based on the assessing indicating, for both the average peak-month power consumption of the electrical device across the number of years and average monthly consumption across the number of years, that aging of the device has a statistically significant impact on the increase in energy consumption independent from any impact of any of the one or more operating parameters, the outputting comprises indicating a high extent of contribution of degradation of the electrical device due to device aging.

20. The computer program product of claim 17, wherein the method further comprises:
    ascertaining, based on the assessed extent of contribution of degradation of the electrical device to the increased power consumption, a level of degradation of the electrical device during the timeframe;
    comparing the ascertained level of degradation of the electrical device to an expected level of degradation of the electrical device expected to occur during the timeframe; and
    triggering the initiating of the repair or replacement based on the comparing indicating that the ascertained level of degradation of the electrical device is abnormal relative to the expected level of degradation.

* * * * *